Patented Apr. 17, 1951

2,549,118

UNITED STATES PATENT OFFICE 2,549,118

VULCANIZED RUBBER AND METHOD OF PRESERVING SAME

Thomas H. Newby, Waterbury, Conn., assignor to United States Rubber Company, New York, N. Y., a corporation of New Jersey No Drawing. Application October 5, 1949,
Serial No. 119,773

13 Claims. (Cl. 260—810)

This invention relates to rubber antioxidants and specifically is based upon my discovery of the ability of aliphatic thioethers of hydroquinones to inhibit degradation and deterioration of rubber upon exposure to heat, light or oxygen.

I have found that rubber may be preserved very effectively by incorporation therein before vulcanization, as an antioxidant therefor, a 1,4-dihydroxybenzene substituted on the benzene ring with one or more —SR groups, R being an aliphatic radical. These compounds are easily and economically prepared from readily available chemicals and are excellent rubber antioxidants.

As an example of the practice of my invention, I may employ mono-substituted 1,4-dihydroxybenzenes having the formula:

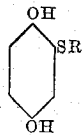

where R is an aliphatic radical. Such products may be prepared by reacting a 1,4-quinone with an aliphatic mercaptan, thus:

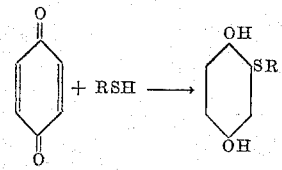

When two moles of the quinone are used, the corresponding quinone is obtained:

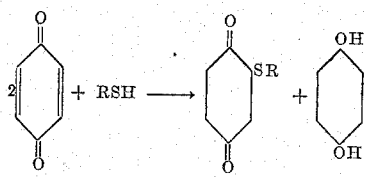

This process can be repeated so as to substitute two, three or even all four available positions of the quinone nucleus. Those reaction products which contain the quinone structure can be converted to the corresponding 1,4-dihydroxybenzene compounds by reduction with alkali metal hydrosulfites. In some cases, the reaction of equimolar proportions of the quinone and the mercaptan yields a mercapto-substituted quinone which may be reduced to the corresponding mercapto-substituted 1,4-dihydroxy benzene by treatment with such a reducing agent. In some cases a poly-mercapto substituted quinone or hydroquinone is obtained by the reaction. This is often true even though equimolar proportions of the reactants are employed.

The reaction between the quinone and the aliphatic mercaptan may be carried out in a polar solvent at temperatures ranging from 0° C. to the boiling point of the solvent.

The preferred quinone is ordinary quinone, i. e., p-benzoquinone.

The 1,4-quinone reactant may be substituted on the ring with substituent groups which do not interfere with the reaction with the aliphatic mercaptan and which do not interfere with the antioxidant action of the mercapto-substituted 1,4-dihydroxybenzene; examples of such substituent groups are nitro, hydroxy and alkyl, e. g., methyl and ethyl. It will be obvious that at least one position on the quinoid ring must be free or unsubstituted to enable the desired reaction to take place.

In general any aliphatic compound containing a thiol group may be reacted with the quinone. Almost invariably this reactant contains only a single thiol group. Examples of suitable aliphatic mercaptans which may be used are the simple alkyl mercaptans, for example ethyl mercaptan, butyl mercaptan, amyl mercaptan, dodecyl mercaptan, etc.; and the aralkyl mercaptans (which are functionally aliphatic) such as benzyl mercaptan and phenylethyl mercaptan. I may also employ mercaptans containing substituent groups which do not interfere with the reaction with the quinone or the antioxidant effectiveness of the reaction product. Examples of such other compounds are the mercaptoalkanols such as mercaptoethanol (monothioglycol), mercaptopropanol, etc. Other examples are the mercaptoalkanecarboxylic acids such as thioglycolic acid.

The products obtained from the aliphatic mercaptans have the important advantage of being less discoloring in rubber and less staining to lacquer than corresponding products obtained from the aromatic mercaptans.

The amount of the mercapto-substituted 1,4-dihydroxybenzene used in the practice of my invention should, of course, be effective to afford substantial protection of the rubber against deterioration upon exposure to the normal deteriorating agencies, namely, heat, light and oxygen. Useful amounts range from 0.05 to 5.0 parts on 100 parts of rubber.

The following examples illustrate my invention in more detail. All parts herein are by weight.

EXAMPLE I

To 32.4 parts (0.3 mol) of p-benzoquinone in 200 cc. of 95% ethanol were slowly added 30.3 parts (0.15 mol) of dodecyl mercaptan. The reaction mixture was stirred at room temperature for two hours and then worked up by quenching in boiling water. The orange precipitate obtained (an excess of quinone was used so the product was a quinone) was filtered, washed with water, and then treated with an equal weight of sodium hydrosulfite dissolved in water. The reduction product, 1,4-dihydroxyphenyl dodecyl sulfide, was a light yellow solid, M. P. 76–79° C.

Analysis:                    Per cent S
  Found _____  10.49
  Theory _____  10.30

EXAMPLE II

To 16 parts (0.2 mol) of mercapto ethanol in refluxing 95% ethanol were added dropwise 22 parts (0.2 mol) of p-benzoquinone in hot ethanol. The reaction was refluxed for two hours during which time the color of the solution grew steadily lighter. At the end of this time the ethanol solvent was removed by aspiration and the residue extracted with benzene to remove any unreacted starting materials. The product, 1,4-dihydroxy-phenyl-hydroxyethyl sulfide, was a light orange semi-solid material. Treatment with sodium hydrosulfite gave no further change in color, thus indicating that the product was a hydroquinone.

Analysis:                    Percent S
  Found _____  17.36
  Theory _____  17.20

EXAMPLE III

Twenty-two grams of p-benzoquinone (0.2 mol) were dissolved in 250 cc. of methanol at room temperature and 18 grams (0.2 mol) of tertiary butyl mercaptan in 50 cc. of methanol added to this solution in 10 cc. portions. The reaction mixture darkened and became very hot. After cooling to room temperature, the solution was treated with aqueous sodium hydrosulfite. Addition of excess water gave a black sludge from which the water was decanted. After washing twice with water the sludge was recrystallized from methanol to give di-(tertiary butylthio) hydroquinone, M. P. 154–156° C., containing 22.21% sulfur (theory—22.38% sulfur).

The methanol filtrate from above was quenched in excess water, the resulting organic tar taken up in ether, dried over anhydrous Na₂SO₄, and the ether removed by evaporation. The resulting black tar analyzed 17.28% sulfur as against 16.2% for 1,4-dihydroxy phenyl tertiary butyl sulfide.

EXAMPLE IV

Twenty-two grams (0.2 mol) of p-benzoquinone were dissolved in 300 cc. of methanol at room temperature and 25 grams (0.2 mol) of benzyl mercaptan were slowly added to the solution. An orange-red precipitate formed immediately, and the solution became very hot. After cooling, the precipitate (8 grams) was filtered off, and treated with aqueous sodium hydrosulfite to give an off-white solid, M. P. 129–131° C. after recrystallization from water. The analysis of this compound corresponds very closely to that for di(benzylthio) hydroquinone.

S (calculated) 18.08%; S (found) 17.90%.

The original filtrate was treated with aqueous sodium hydrosulfite to give an orange oil, which on standing gave white crystals. These crystals melted 101–102° C. after recrystallization from methanol. The analysis for this compound corresponds very closely to that for tris(benzylthio) hydroquinone. In this case no mono(benzylthio) hydroquinone was isolated.

S (calculated) 20.17%; S (found), 19.96%.

Rubber tests

The compounds prepared in Examples I to IV were tested in a natural rubber white stock of the following composition:

Pale crepe _____ 100
Zinc oxide _____ 10
Lithopone _____ 60
Whiting _____ 60
Zinc laurate _____ 0.5
Sulfur _____ 3.0
Tetramethyl thiuram monosulfide _____ 0.15

The antioxidant was incorporated in the ratio of 1.0 part per 100 parts of rubber. Cures were made for 10, 20, and 30 minutes at 30 pounds steam. Table I shows the tensiles and elongations of these stocks unaged, after aging ninety-six hours under 300 pounds oxygen at 70° C.

*Table I*

| Antioxidant | Unaged | | Oxygen | |
|---|---|---|---|---|
| | Tensile | Elong. | Tensile | Elong. |
| 10′ CURE | | | | |
| None | 2,030 | 663 | failed | |
| A. 1,4-dihydroxyphenyl dodecyl sulfide | 1,975 | 690 | 1,560 | 630 |
| B. 1,4-dihydroxyphenyl hydroxyethyl sulfide | 2,030 | 676 | 1,600 | 586 |
| C. 1,4-dihydroxyphenyl tert. butyl sulfide | 2,220 | 690 | 1,920 | 650 |
| D. Tris (benzylthio) hydroquinone | 2,190 | 716 | 1,160 | 620 |
| 20′ CURE | | | | |
| None | 1,910 | 670 | failed | |
| A | 1,930 | 660 | 1,050 | 575 |
| B | 2,080 | 660 | 1,550 | 586 |
| C | 2,130 | 683 | 1,600 | 600 |
| D | 2,000 | 700 | 680 | 565 |
| 30′ CURE | | | | |
| None | 1,825 | 700 | failed | |
| A | 1,900 | 650 | 470 | 406 |
| B | 2,100 | 663 | 1,200 | 530 |
| C | 1,950 | 680 | 1,480 | 600 |
| B | 1,875 | 690 | 200 | 100 |

In the practice of my invention, standard rubber compounding and vulcanizing technique well-known to those skilled in the art is employed.

The compounds of my invention are effective anti-oxidants for natural rubber or any synthetic rubber which is normally subject to deterioration upon exposure to oxygen. Examples of such synthetic rubber include the rubbery copolymers of butadiene and styrene typified by GR-S and the rubbery copolymers of butadiene and acrylonitrile (Buna N).

Having thus described my invention, what I claim and desire to protect by Letters Patent is:

1. A method of preserving rubber which comprises incorporating therein before vulcanization a minor proportion of a 1,4-dihydroxybenzene substituted on the ring with at least one —SR group where R is an aliphatic radical, the only groups bonded to the sulfur atom in said —SR group being said R and the benzene ring of the 1,4-dihydroxybenzene.

2. A method of preserving rubber which comprises incorporating therein before vulcanization a minor proportion of a 1,4-dihydroxyphenyl alkyl sulfide, in which the alkylthio group is substituted on the benzene ring carrying the hydroxy groups in the 1- and 4-positions.

3. A method of preserving rubber which comprises incorporating therein before vulcanization a minor proportion of 1,4-dihydroxyphenyl dodecyl sulfide.

4. A method of preserving rubber which comprises incorporating therein before vulcanization a minor proportion of 1,4-dihydroxyphenyl hydroxyethyl sulfide.

5. A method of preserving rubber which comprises incorporating therein before vulcanization a minor proportion of 1,4-dihydroxyphenyl tertiary butyl sulfide.

6. Vulcanized rubber preserved with a minor proportion of a 1,4-dihydroxybenzene substituted on the ring with at least one —SR group where R is an aliphatic radical, the only groups bonded to the sulfur atom in said —SR group being said R and the benzene ring of the 1,4-dihydroxybenzene.

7. Vulcanized rubber preserved with a minor proportion of a 1,4-dihydroxyphenyl alkyl sulfide, in which the alkylthio group is substituted on the benzene ring carrying the hydroxy groups in the 1- and 4-positions.

8. Vulcanized rubber preserved with a minor proportion of 1,4-dihydroxyphenyl dodecyl sulfide.

9. Vulcanized rubber preserved with a minor proportion of 1,4-dihydroxyphenyl hydroxyethyl sulfide.

10. Vulcanized rubber preserved with a minor proportion of 1,4-dihydroxyphenyl tertiary butyl sulfide.

11. Vulcanized rubber preserved with a 1,4-dihydroxybenzene substituted on the ring with at least one —SR group where R is an aliphatic radical, the only groups bonded to the sulfur atom in said —SR group being said R and the benzene ring of the 1,4-dihydroxybenzene ranging from 0.05 to 5.0 parts thereof per 100 parts of rubber.

12. A method of preserving rubber which comprises incorporating therein before vulcanization from 0.05 to 5.0 parts per 100 parts of rubber of a compound having the formula

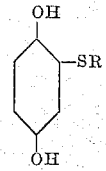

where R is an aliphatic radical selected from the group consisting of unsubstituted alkyl groups and hydroxyalkyl groups having from 2 to 12 carbon atoms.

13. Vulcanized rubber preserved with from 0.05 to 5.0 parts per 100 parts of rubber of a compound having the formula

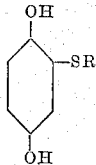

where R is an aliphatic radical selected from the group consisting of unsubstituted alkyl groups and hydroxyalkyl groups having from 2 to 12 carbon atoms.

THOMAS H. NEWBY.

REFERENCES CITED

The following references are of record in the file of this patent:

UNITED STATES PATENTS

| Number | Name | Date |
|---|---|---|
| 1,849,489 | Howland | Mar. 15, 1932 |
| 2,074,851 | Miller | Mar. 23, 1937 |
| 2,298,881 | Gibbs | Oct. 13, 1942 |
| 2,310,449 | Lightbown et al. | Feb. 9, 1943 |
| 2,364,338 | Beaver | Dec. 5, 1944 |